(12) United States Patent
Peng et al.

(10) Patent No.: US 9,665,623 B1
(45) Date of Patent: May 30, 2017

(54) KEY-VALUE STORE UTILIZING RANGED KEYS IN SKIP LIST DATA STRUCTURE

(71) Applicant: EMC Corporation, Hopkinton, MA (US)

(72) Inventors: Tao Peng, Beijing (CN); Sorin Faibish, Newton, MA (US); Haiying Tang, Beijing (CN); John M. Bent, Los Alamos, NM (US)

(73) Assignee: EMC IP Holding Company LLC, Hopkinton, MA (US)

(*) Notice: Subject to any disclaimer, the term of this patent is extended or adjusted under 35 U.S.C. 154(b) by 393 days.

(21) Appl. No.: 13/840,420

(22) Filed: Mar. 15, 2013

(51) Int. Cl.
*G06F 7/00* (2006.01)
*G06F 17/30* (2006.01)

(52) U.S. Cl.
CPC .. *G06F 17/30477* (2013.01); *G06F 17/30946* (2013.01); *G06F 17/30982* (2013.01)

(58) Field of Classification Search
CPC .................................................. G06F 17/30946
USPC ....................................................... 707/800
See application file for complete search history.

(56) References Cited

U.S. PATENT DOCUMENTS

| | | | |
|---|---|---|---|
| 5,379,422 A * | 1/1995 | Antoshenkov | |
| 7,184,437 B1 * | 2/2007 | Cole et al. | 370/392 |
| 8,375,062 B2 * | 2/2013 | Herlihy et al. | 707/800 |
| 8,612,402 B1 * | 12/2013 | Givargis | 707/693 |
| 8,768,889 B1 * | 7/2014 | Martin | 707/649 |
| 2002/0118682 A1 * | 8/2002 | Choe | 370/395.31 |
| 2004/0210946 A1 * | 10/2004 | Shin | 725/135 |
| 2012/0117067 A1 * | 5/2012 | Yakubovich et al. | 707/737 |

OTHER PUBLICATIONS

Bradford G. Nickerson. "Skip List Data Structures for Multidimensional Data." UMIACS Technical Report, Apr. 1994. 39 pages.*
Eleanor Cawthon, "A Distributed Key-Value Store Using Ceph," Summer 2012, 19 pages.
G. Decandia et al., "Dynamo: Amazon's Highly Available Key-Value Store," Proceedings of Twenty-First ACM SIGOPS Symposium on Operating Systems Principles (SOSP), Oct. 2007, pp. 205-220.

(Continued)

*Primary Examiner* — Charles Lu
(74) *Attorney, Agent, or Firm* — Ryan, Mason & Lewis, LLP

(57) ABSTRACT

A processing platform of an information processing system comprises one or more processing devices and implements a key-value store that utilizes a skip list data structure having a plurality of layers each having two or more nodes, with each of at least a subset of the nodes of the skip list data structure storing a corresponding ranged key having a range of keys associated therewith. A given one of the ranged keys corresponds to a single value stored in the key-value store and comprises a lower key and an upper key of the range of keys but does not explicitly include intermediate keys in the range of keys. A burst buffer appliance may be associated with the key-value store and configured to process ranged keys of one or more skip list data structures for storage in or retrieval from the key-value store.

20 Claims, 4 Drawing Sheets

(56) References Cited

OTHER PUBLICATIONS

R. Escriva et al., "HyperDex: A Distributed, Searchable Key-Value Store," Proceedings of the ACM SIGCOMM 2012 Conference on Applications, Technologies, Architectures, and Protocols for Computer Communication (SIGCOMM), Aug. 2012, pp. 25-36, Helsinki, Finland.

Y. Mao et al., "Cache Craftiness for Fast Multicore Key-Value Storage," Proceedings of the 7th ACM European Conference on Computer Systems (EuroSys), Apr. 2012, pp. 183-196, Bern, Switzerland.

Nishimura Shoji, "Key-Value Store "MD-HBase" Enables Multi-Dimensional Range Queries," NEC Technical Journal, Advanced Technologies to Support Big Data Processing, Sep. 2012, pp. 76-80, vol. 7, No. 2.

M. Armbrust et al., "PIQL: Success-Tolerant Query Processing in the Cloud," Proceedings of the Very Large Data Bases (VLDB) Endowment, Aug. 2012, pp. 181-192, vol. 5, No. 3, Istanbul, Turkey.

J. Bent et al., "PLFS: A Checkpoint Filesystem for Parallel Applications," ACM/IEEE Conference on High Performance Computing Networking, Storage and Analysis, SC09, Nov. 2009, 12 pages, Article No. 21.

\* cited by examiner

KEY-VALUE STORE UTILIZING RANGED KEYS IN SKIP LIST DATA STRUCTURE

FIELD

The field relates generally to information processing systems, and more particularly to information processing systems that utilize key-value stores.

BACKGROUND

A key-value store refers generally to a data store in which data objects or "values" are stored in association with respective unique keys. The values may comprise strings, numbers, arrays or any other type of data. Unlike relational data stores, key-value stores do not require the use of any specific data model and therefore provide a high degree of flexibility in terms of the format in which data is stored. Accordingly, applications utilizing a key-value store can store a wide variety of different types and arrangements of data without requiring the use of particular relational database schema or other strict data formats. The key-value store typically provides an application programming interface (API) that allows stored values to be retrieved and processed using the corresponding keys.

Most conventional key-values stores provide only a single arbitrary mapping between keys and respective values. However, this can unduly restrict the types of comparisons and other functions that can be performed by applications, thereby limiting the achievable throughput performance of the key-value store.

SUMMARY

Illustrative embodiments of the present invention provide improved key-value stores that utilize ranged keys in skip list data structures.

In one embodiment, a processing platform of an information processing system comprises one or more processing devices and implements a key-value store that utilizes a skip list data structure having a plurality of layers each having two or more nodes, with each of at least a subset of the nodes of the skip list data structure storing a corresponding ranged key having a range of keys associated therewith.

By way of example, a given one of the ranged keys may correspond to a single value stored in the key-value store. The given ranged key may be configured so as to comprise a lower key and an upper key of the range of keys without explicitly including intermediate keys in the range of keys.

In some embodiments, a burst buffer appliance may be associated with the key-value store and configured to process ranged keys of one or more skip list data structures for storage in or retrieval from the key-value store. For example, a burst buffer appliance of this type may be utilized to implement a virtual layer of a parallel log-structured file system incorporated in or otherwise associated with the key-value store. Numerous other types of file systems and burst buffer appliance configurations can be used in other embodiments. Also, embodiments of the invention can be implemented without use of a burst buffer appliance.

One or more of the illustrative embodiments described herein exhibit enhanced performance relative to conventional arrangements. For example, these embodiments provide more efficient and flexible implementation of compare functions supporting a wide variety of operations such as sort, query, insert and delete, thereby substantially improving the throughput performance of the key-value store.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
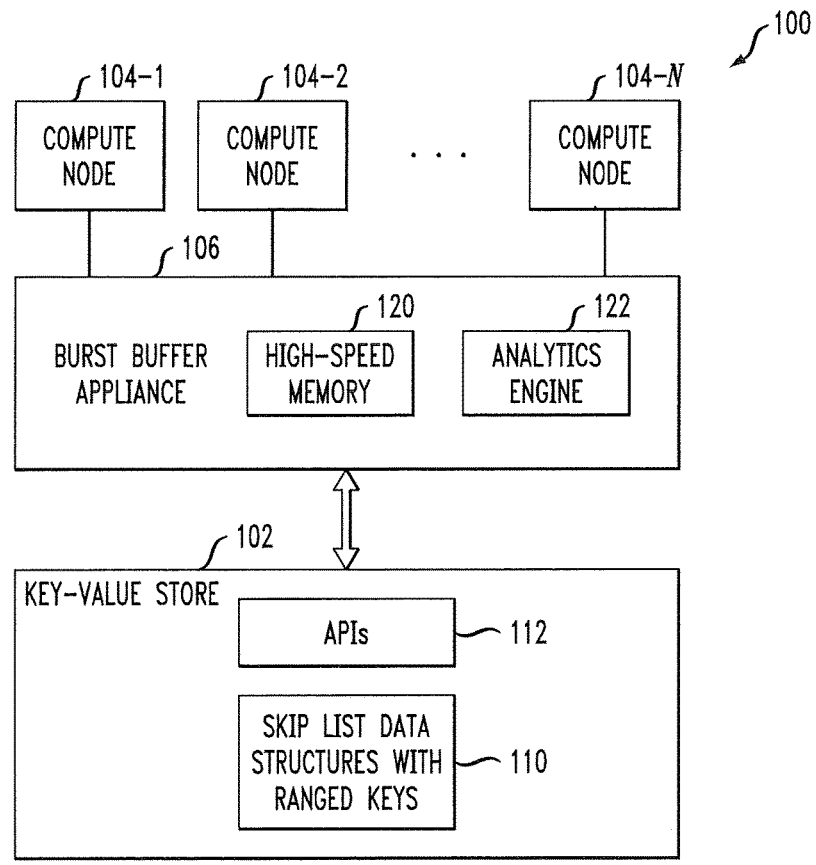
FIG. 1 is a block diagram of an information processing system comprising a key-value store utilizing ranged keys in skip list data structures in an illustrative embodiment of the invention.

FIG. 1 shows an information processing system 100 configured in accordance with an illustrative embodiment of the present invention. The information processing system 100 comprises a key-value store 102 coupled to a plurality of compute nodes 104-1, 104-2, . . . 104-N, which may be collectively viewed as an example of a supercomputer or other type of high-performance computer system, or more generally a "computer system," as that term is broadly utilized herein. In this embodiment, the key-value store 102 is coupled to the compute nodes 104 via a burst buffer appliance 106, but in other embodiments the burst buffer appliance 106 may be eliminated and the key-value store 102 may be coupled to the compute nodes 104 via a network or other system component.

The key-value store 102 comprises a plurality of skip list data structures 110 that are utilized for storing data. As will be described below in conjunction with FIGS. 2 through 4, a given such skip list data structure generally comprises a plurality of layers each having two or more nodes, with each of at least a subset of the nodes of the skip list data structure storing a corresponding ranged key having a range of keys associated therewith. Other types of data structures may be used in addition to or in place of the particular skip list data structures illustrated in FIGS. 2 through 4. The term "skip list data structure" as used herein is therefore intended to be broadly construed so as to encompass a wide variety of different data structures having multiple layers each with two or more nodes. In some embodiments, the key-value store may utilize a combination of skip list data structures and one or more other types of data structures.

A given one of the above-noted ranged keys of the skip list data structures 110 generally corresponds to a single value stored in the key-value store and comprises a lower key and an upper key of the range of keys but does not explicitly include intermediate keys in the range of keys. However, a variety of other types of ranged key configurations may be used in other embodiments. The term "ranged key" as utilized herein is therefore intended to be broadly construed.

The key-value store 102 further comprises a plurality of APIs 112 that allow various operations to be performed on the skip list data structures 110 utilizing their associated ranged keys. For example, operations such as a sort operation, a query operation, an insert operation and a delete operation may be performed via the APIs 112 utilizing the ranged keys stored in the nodes of the skip list data structures 110. These and other operations performed in the key-value store 102 may make use of one or more comparator functions that are configured to operate on the ranged keys of the skip list data structures 110. Such a comparator function may, for example, define conditions under which one ranged key is considered larger than another ranged key, or conditions under which two ranged keys are considered equal. Multiple comparator functions of these and a variety of other different types may be implemented in the key-value store 102.

The burst buffer appliance 106 may be configured to process ranged keys of one or more skip list data structures for storage in or retrieval from a file system associated with the key-value store 102. The burst buffer appliance 106 in the present embodiment comprises a high-speed memory 120 and an analytics engine 122.

The high-speed memory 120 is assumed to have a substantially lower access time than the file system associated with the key-value store 102. For example, a parallel log-structured file system (PLFS) or other type of parallel file system may be incorporated in or otherwise associated with the key-value store 102.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein.

In an arrangement of this type, the burst buffer appliance may be utilized to implement a virtual layer of the PLFS. Numerous alternative file systems, such as, for example, Hadoop distributed file system (HDFS) or Lustre file system, may be used in conjunction with key-value store 102.

The analytics engine 122 of the burst buffer appliance 106 performs various analytics functions on data that may be stored in or retrieved from the key-value store 102 via the burst buffer appliance 106.

The burst buffer appliance 106 is illustratively shown as being coupled to each of the compute nodes 104 and may be used, for example, to facilitate the storage of periodic checkpoints for those compute nodes. Alternatively, each compute node 104 may have a separate instance of the burst buffer appliance 106 associated therewith, although only a single instance of the burst buffer appliance 106 is shown in FIG. 1 for simplicity and clarity of illustration. Again, other embodiments need not utilize any burst buffer appliance.

The high-speed memory 120 may comprise flash memory, although other types of low-latency memory could be used. Typically, such low-latency memories comprise electronic memories, which may be implemented using non-volatile memories, volatile memories or combinations of non-volatile and volatile memories. The high-speed memory 120 is assumed to have a substantially lower access time for write and read operations directed thereto than write and read operations directed to the parallel file system or other file system incorporated in or otherwise associated with the key-value store 102. Thus, the burst buffer appliance 106 is configured to accelerate input-output (IO) operations between the compute nodes 104 and the parallel file system or other file system associated with the key-value store 102 by temporarily storing data in the high-speed memory 120.

For example, the burst buffer appliance 106 in the present embodiment may be configured to enhance the throughput performance of the information processing system 100 by supporting fast checkpointing of one or more of the compute nodes 104. More particularly, one or more of the compute nodes 104 can write checkpoint data to the burst buffer 106 at very high speeds, and that checkpoint data is later written at a much slower rate from the burst buffer 106 to the parallel file system or other file system associated with the key-value store 102. This ensures that other operations of the one or more compute nodes 104 are not unduly delayed by the writing of checkpoint data while also allowing the system 100 to continue to utilize the parallel file system or other file system associated with the key value store 102.

Accordingly, the term "burst buffer appliance" as used herein is intended to be broadly construed, so as to encompass any network appliance or other arrangement of hardware and associated software or firmware that collectively provides a high-speed memory and associated access control mechanisms for distinct types of JO operations. Thus, such an appliance includes a high-speed memory that may be viewed as serving as a buffer between a computer system such as that represented by the collective compute nodes 104 and a file system such as a PLFS or other parallel file system associated with key-value store 102, for storing bursts of data associated with different types of JO operations.

The burst buffer appliance 106 may be configured to include a plurality of virtual machines for processing respective different types of IO operations that involve utilization of the high-speed memory 120, such that each of the virtual machines provides a different performance level for its associated type of JO operations.

The key-value store 102, compute nodes 104 and burst buffer appliance 106 may communicate with one another over one or more networks such as, for example, a global computer network such as the Internet, a wide area network (WAN), a local area network (LAN), a satellite network, a telephone or cable network, a cellular network, a wireless network such as WiFi or WiMAX, or various portions or combinations of these and other types of communication networks.

At least portions of the key-value store 102, compute nodes 104 and burst buffer appliance 106 may be implemented using one or more processing platforms, examples of which will be described in greater detail below in conjunction with FIGS. 5 and 6. A given such processing platform comprises at least one processing device comprising a processor coupled to a memory, and the processing device may be implemented at least in part utilizing one or more virtual machines.

Although shown in FIG. 1 as being separate from the key-value store 102 and compute nodes 104, the burst buffer appliance 106 in other embodiments may be implemented at least in part within one or more of these system elements. It is also to be appreciated that a given embodiment of the information processing system 100 may include multiple instances of one or more of the key-value store 102 and burst buffer appliance 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the skip list data structure diagrams of FIGS. 2 through 4.

Figure 2:
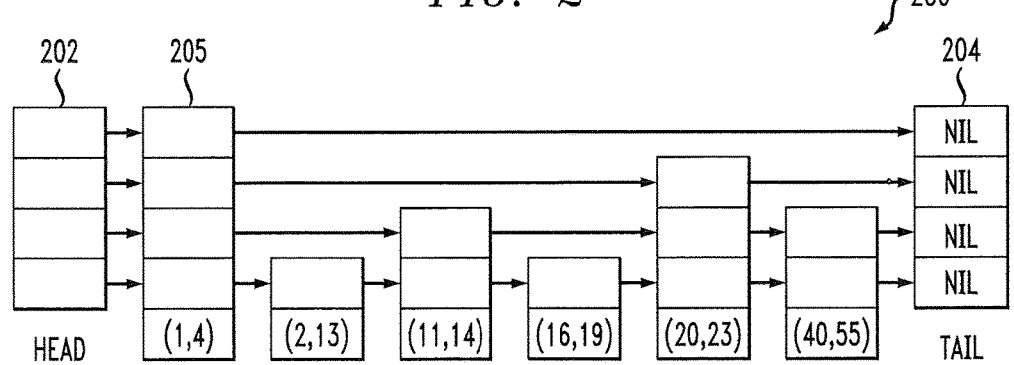
FIG. 2 shows an example of one possible skip list data structure with ranged keys in the FIG. 1 key-value store.

Referring initially to FIG. 2, a given skip list data structure 200 as shown comprises a plurality of layers each having two or more nodes. In this example, each layer comprises a head node joined to a corresponding tail node via a horizontal line that passes from the head node to the tail node via one or more intermediate nodes. For example, the uppermost layer in the skip list data structure 200 comprises a head node 202 joined to a corresponding tail node 204 via a horizontal line that passes from the head node to the tail node via a single intermediate node 205. The number of intermediate nodes between the head node and the tail node increases from one intermediate node in the uppermost layer to two, four and six intermediate nodes for respective lower layers of the skip list data structure 200.

The various layers of the skip list data structure 200 may each be viewed as a distinct linked list of nodes from a head node to a tail node. Each tail node is designated as a NIL node in this embodiment. The layers are arranged in a hierarchy from fewer intermediate nodes at upper layers to more intermediate nodes at lower layers, in a manner that facilitates lookup of particular values within the data structure. In a given upper layer of the data structure, links of the corresponding linked list of nodes skip over one or more intermediate nodes of the linked list of a lower layer.

A search for a target node begins at the head node in the linked list of the uppermost layer, and proceeds horizontally until the current node is greater than or equal to the target node. If the current node is equal to the target node, the target node has been found. If the current node is greater than the target node, or the search reaches the end of the linked list of the current layer, the procedure is repeated after returning to the previous node and dropping down vertically to the next lower layer.

The intermediate nodes of a given layer of the skip list data structure 200 each store a different ranged key comprising lower and upper keys. More particularly, with reference to the lowermost layer of the skip list data structure 200, the first through sixth intermediate nodes of that layer store respective ranged keys (1,4), (2,13), (11,14), (16,19), (20,23) and (40,55), respectively. Each intermediate node in a given column of the skip list data structure 200 stores the same ranged key shown in the figure as corresponding to that column, regardless of the particular layer that the intermediate node is in. Accordingly, each node of a given layer of the skip list data structure 200 other than head and tail nodes of the given layer stores a different ranged key comprising lower and upper keys.

A given one of the above-noted ranged keys of the skip list data structure 200 generally corresponds to a single value stored in the key-value store 102 and comprises a lower key and an upper key of the range of keys but does not explicitly include intermediate keys in the range of keys. Thus, the given ranged key identifies a range of keys but does not incorporate all of the individual keys in that range. The given ranged key in this embodiment is therefore not composed of multiple instances of single keys having respective corresponding values, and it is the ranged key itself, rather than any single key within the corresponding range, that corresponds to a value stored in the key-value store 102. Each ranged key is generally of the form (A, B), where A and B are respective lower and upper keys of the ranged key. Other types of ranged key formats may be used in other embodiments.

The APIs 112 of the key-value store 102 are configured to support functionality associated with the exemplary ranged key skip list data structure 200 of FIG. 2. For example, the following modifications may be made relative to conventional APIs:

1. An initialization API can be configured to indicate support for ranged keys, to pass in a first comparator function as a default range key sorting function, and to pass in a second comparator function as default query function.

2. A put(•) API can pass in a mapping from a ranged key to a single value.

3. A get(•) API can pass in ranged keys as an argument, and optionally specify a comparator function that is used for a query operation. The result of the get(•) API is all stored mappings having ranged keys that are matched by the specified comparator function.

4. A delete(•) API can pass in ranged keys as an argument, and optionally specify a comparator function that is used for searching all matching keys that will be deleted.

The above API configurations are exemplary only, and other types of APIs can be used in other embodiments.

The following is exemplary pseudocode for possible implementations of the put(•) and get(•) APIs, in which the ranged key corresponds to a single value:

```
Status Put(RangeKey &key, Value &value)
{
    Node *x = skiplist->FindGreaterOrEqual(key); // search with default comparator
    Node *n = skiplist->NewNode(key, INSERT, timestamp);
    skiplist->InsertBefore(n, x);
    return 0;
}
Status Get(RangeKey &key, list<KV_Pair> &result, Comparator *comp=NULL)
{
    comp = comp?:env->comp;
    for each height of skiplist {
        for (itor = skiplist->Begin( ) to skiplist->End( ))
        {
            if ((s = comp(itor->Key( ), key)) == 0)
                result.push_back(KV_Pair(itor->Key( ), itor->Value( ));
            else if (s > 0)
                break;
        }
    }
    return 0;
}
```

Similar pseudocode implementations can be provided for other APIs 112 of the key-value store 102. For example, the update(•) and delete(•) APIs may be implemented in a manner similar to that shown above for the put(•) API.

However, the above pseudocode should be considered an illustrative example only, and numerous alternative implementations of the APIs 112 of the key-value store 102 may be used in other embodiments.

Use of the ranged key skip list data structure of FIG. 2 in conjunction with corresponding support provided in APIs 112 as described above advantageously allows system components such as the above-noted PLFS or other file systems or applications to sort, query, insert and delete data of the key-value store 102 using ranged keys in a manner that would not otherwise be possible in conventional key-value stores.

For example, conventional key-value stores based on single keys generally require that the same comparator function be utilized for sort and query operations. However, the key-value store 102 implementing the ranged key skip list data structure 200 can use different comparator functions for sort and query operations. Also, the comparator function used for query operations in key-value store 102 does not require unique keys.

As a more particular example of the advantages associated with use of different comparators for sort and query operations, assume that ranged key mappings such as (offset 100, len 300)→(some file and offset) and (offset 400, len 200)→(some file and offset) are stored in key-value store 102 using PLFS. The ranged key skip list data structure 200 allows the use of a modified comparator function that will return matched mappings for a query using a different ranged key such as (offset 200, len 300) that is not itself stored in the key-value store. PLFS can then merge the returned matched mappings to thereby determine the current location of the data corresponding to (offset 200, len 300). Similar advantages are provided in the context of other file systems as well as a wide variety of other ranged key applications that may be associated with the key-value store 102.

It is apparent from the above that the key-value store 102 provides enhanced efficiency and flexibility in configuration of the comparator functions that are used to support operations such as sort, query, insert and delete.

By way of example, a given comparator function used to sort ranged keys may define conditions under which one ranged key is considered larger than another ranged key. A comparator function of this type can define a first ranged key (A, B) as being larger than a second ranged key (C, D) based at least in part on a designated function of at least one of A and B and at least one of C and D, where A and B are respective lower and upper keys of the first ranged key and C and D are respective lower and upper keys of the second ranged key. As a more particular example, the comparator function may define (A, B) as larger than (C, D) when A>B or (A==C) && (B>D), although the comparator function may alternatively utilize other logic functions of A, B, C and D.

Figure 3:
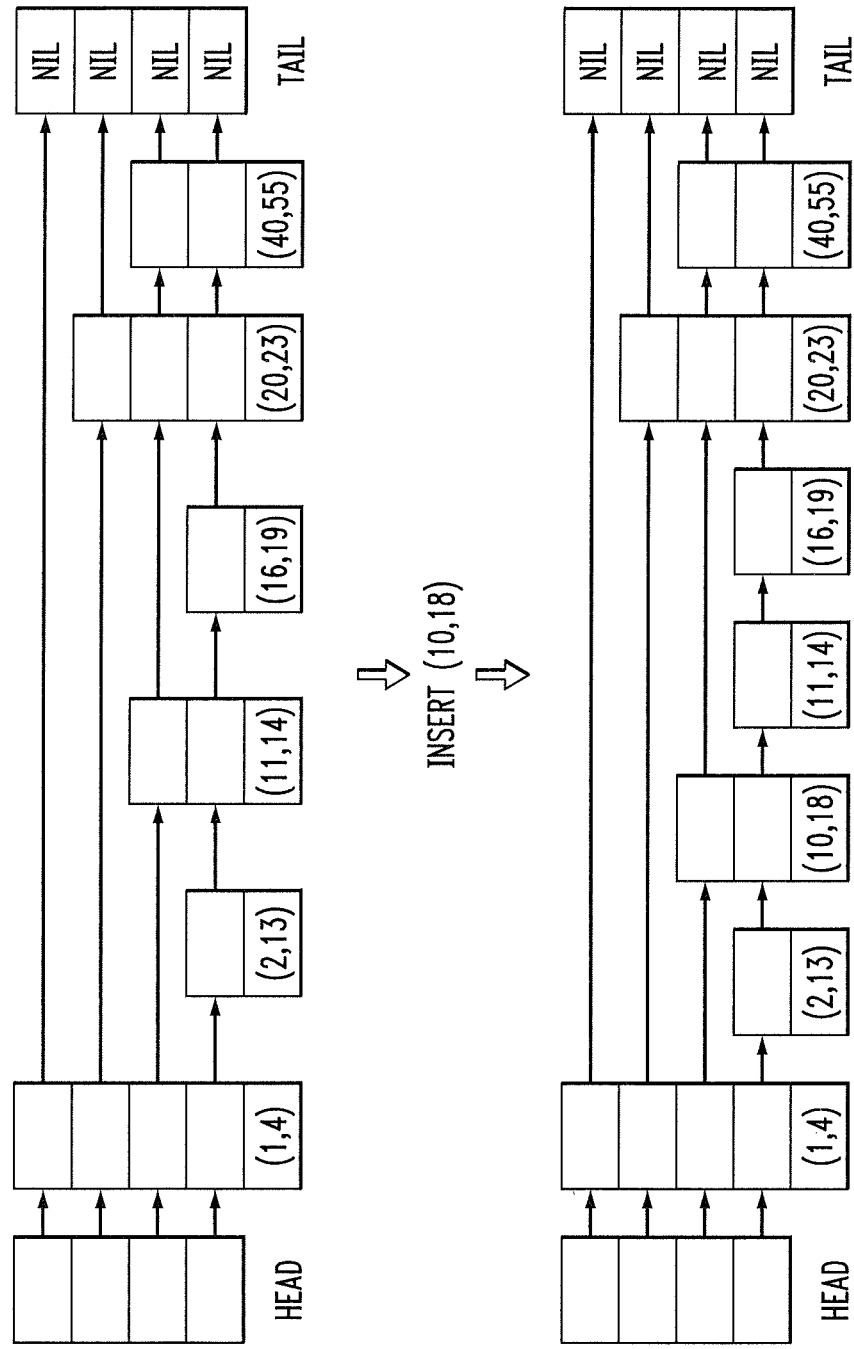
FIGS. 3 and 4 illustrate respective insert and delete operations performed on the FIG. 2 skip list data structure in the FIG. 1 key-value store.

FIG. 3 illustrates an insert operation performed on the skip-list data structure of FIG. 2 using a comparator function of the type described above. In this diagram, additional intermediate nodes are created in the skip list data structure to store the inserted ranged key (10,18) as shown.

Numerous other types of comparator functions may be supported in the key-value store 102 via APIs 112 and skip list data structures 110. For example, a comparator function may define conditions under which two ranged keys are considered equal. A comparator function of this type can define a first ranged key (A, B) as being equal to a second ranged key (C, D) based at least in part on a designated function of at least one of A and B and at least one of C and D, where again A and B are respective lower and upper keys of the first ranged key and C and D are respective lower and upper keys of the second ranged key. As a more particular example, the comparator function may define (A, B) as being equal to (C, D) when the respective ranges of (A, B) and (C, D) overlap. Other logic functions of A, B, C and D may be used to define equality of ranges in other embodiments.

A comparator function can be configured to delete one or more ranged keys of the skip list data structure 200. In conjunction with deletion of a given one of the ranged keys of the skip list data structure, this type of comparator function may split the corresponding node so as to create at least one additional node in the skip list data structure indicating deletion of the given ranged key.

Figure 4:
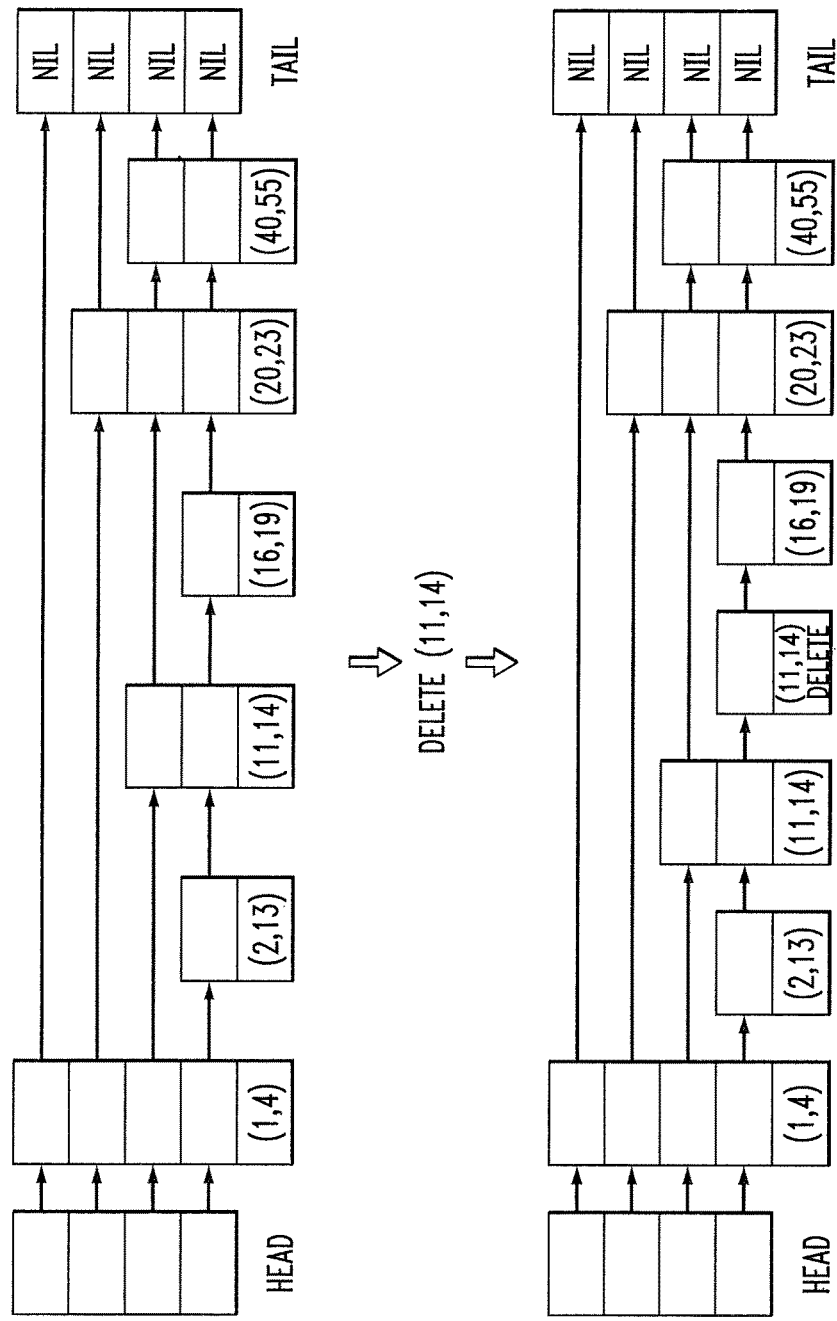

FIG. 4 illustrates a delete operation performed on the skip-list data structure of FIG. 2 using a comparator function of the type described above. In this diagram, an additional intermediate node is created in the skip list data structure to store an indication that the ranged key (11,14) has been deleted.

In the exemplary skip list data structures of FIGS. 2 through 4, different nodes of the skip list data structure are permitted to have respective key ranges that may include at least one key that is the same within each of the different nodes, depending on the particular type of comparator function used.

Also, a query operation may be configured so as not to terminate upon finding a matching ranged key but instead to terminate upon finding a first non-matching ranged key after a matching ranged key is found.

The particular processing operations and other system functionality described in conjunction with FIGS. 1 through 4 are presented by way of illustrative example only, and should not be construed as limiting the scope of the invention in any way. Alternative embodiments can use other types and arrangements of key-value stores, skip list data structures and ranged keys.

It is to be appreciated that functionality such as that described in conjunction with FIGS. 1 through 4 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

It was noted above that portions of the information processing system 100 may be implemented using one or more processing platforms. Illustrative embodiments of such platforms will now be described in greater detail.

Figure 5:
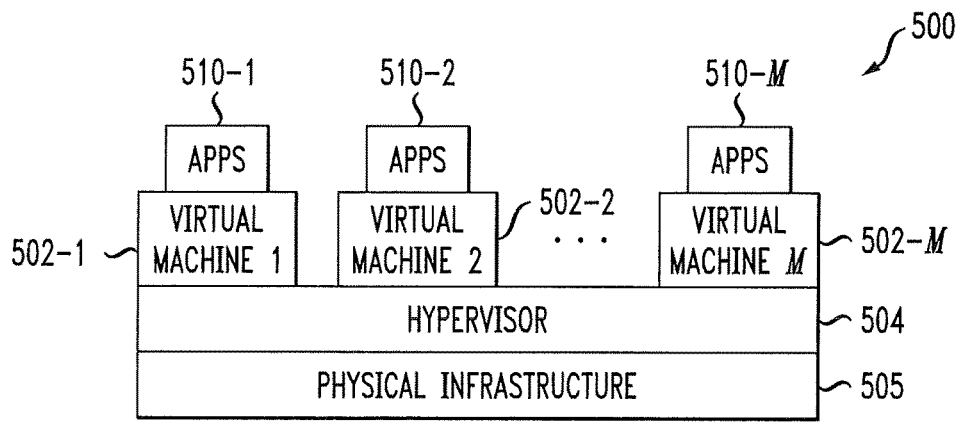
FIGS. 5 and 6 show examples of processing platforms that may be utilized to implement at least a portion of the information processing system of FIG. 1.
Figure 6:
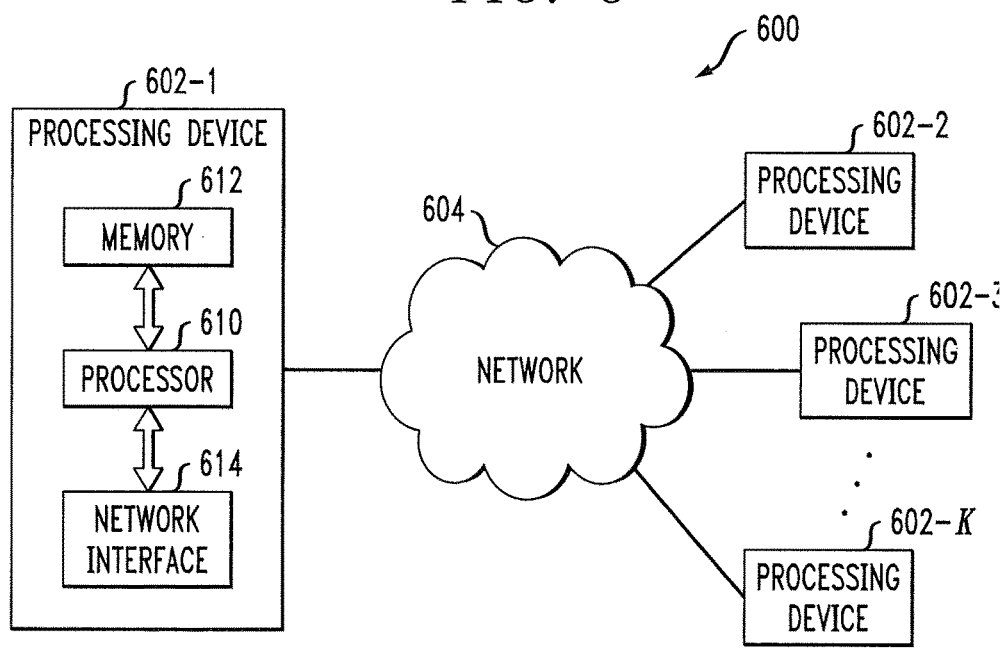

As shown in FIG. 5, portions of the information processing system 100 may comprise cloud infrastructure 500. The cloud infrastructure 500 comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring system elements such as compute nodes 104 and burst buffer appliance 106.

An example of a commercially available hypervisor platform that may be used to implement hypervisor 504 and possibly other portions of the information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA) or other type of processing circuitry, as well as portions or combinations of such circuitry elements, and the memory 612, which may be viewed as an example of a "computer program product" having executable computer program code embodied therein, may comprise random access memory (RAM), read-only memory (ROM) or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a key-value store as disclosed herein can be implemented at least in part in the form of one or more software programs stored in memory and executed by a processor of a processing device such as one of the virtual machines 502 or one of the processing devices 602. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, the disclosed techniques are applicable to a wide variety of other types of information processing systems and devices that can benefit from the use of ranged keys in a skip list data structure as described herein. Also, the particular configurations of system and device elements shown in FIGS. 1 through 6 can be varied in other embodiments. Thus, for example, the particular types of key-value stores, skip list data structures and ranged keys deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device implementing a key-value store;
   the key-value store being configured for communication with a plurality of additional processing devices over a network via at least one application programming interface of the key-value store;
   wherein the key-value store utilizes a skip list data structure having a plurality of layers each having two or more nodes;
   wherein each of at least a subset of the nodes of the skip list data structure stores a corresponding ranged key;
   wherein the ranged key corresponds to a single value stored in the key-value store;
   wherein the ranged key comprises a lower key and an upper key of a range of keys but does not explicitly include intermediate keys of the range of keys;
   wherein presentation of the ranged key to the key-value store from a given one of the additional processing devices via the application programming interface returns the corresponding single value stored in the key-value store for delivery to the given additional processing devices via the application programming interface.

2. The apparatus of claim 1 wherein each node of a given layer of the skip list data structure other than head and tail nodes of the given layer stores a different ranged key comprising lower and upper keys.

3. The apparatus of claim 1 wherein said key-value store implements a comparator function configured to operate on the ranged keys of the skip list data structure.

4. The apparatus of claim 3 wherein the comparator function is applied in conjunction with performance of at least one of a sort operation, a query operation, an insert operation and a delete operation utilizing the ranged keys.

5. The apparatus of claim 3 wherein the comparator function defines conditions under which one ranged key is considered larger than another ranged key.

6. The apparatus of claim 5 wherein the comparator function defines a first ranged key (A, B) as being larger than a second ranged key (C, D) based at least in part on a designated function of at least one of A and B and at least one of C and D, where A and B are respective lower and upper keys of the first ranged key and C and D are respective lower and upper keys of the second ranged key.

7. The apparatus of claim 3 wherein the comparator function defines conditions under which two ranged keys are considered equal.

8. The apparatus of claim 7 wherein the comparator function defines a first ranged key (A, B) as being equal to a second ranged key (C, D) based at least in part on a designated function of at least one of A and B and at least one of C and D, where A and B are respective lower and upper keys of the first ranged key and C and D are respective lower and upper keys of the second ranged key.

9. The apparatus of claim 3 wherein the comparator function is configured to delete one or more ranged keys of the skip list data structure, wherein in conjunction with deletion of a given one of the ranged keys of the skip list data structure, the comparator function splits the corresponding node so as to create at least one additional node in the skip list data structure indicating deletion of the given ranged key.

10. The apparatus of claim 1 wherein different nodes of the skip list data structure are permitted to have respective key ranges that include at least one key that is the same within each of the different nodes.

11. The apparatus of claim 4 wherein the query operation does not terminate upon finding a matching ranged key but instead terminates upon finding a first non-matching ranged key after a matching ranged key is found.

12. The apparatus of claim 1 further comprising a burst buffer appliance associated with the key-value store.

13. The apparatus of claim 12 wherein the burst buffer appliance comprises:
a high-speed memory having a substantially lower access time than a file system associated with the key-value store; and
an analytic engine;
the burst buffer appliance being configured to process ranged keys of one or more skip list data structures for storage in or retrieval from the file system associated with the key-value store.

14. A processing platform that incorporates the apparatus of claim 1.

15. The apparatus of claim 1 wherein said at least one application programming interface comprises:
a first application programming interface for specifying a mapping from the ranged key to the single value;
a second application programming interface for specifying a comparator function of a first type for a sorting function; and
a third application programming interface for specifying a comparator function of a second type different than the first type for a query function.

16. The apparatus of claim 15 wherein the comparator function of the second type is configured to permit a query based on a ranged key that is not itself stored in the key-value store.

17. A method comprising:
providing in a key-value store a skip list data structure having a plurality of layers each having two or more nodes; and
storing in each of at least a subset of the nodes of the skip list data structure a corresponding ranged key;
wherein the providing and storing are performed by at least one processing device;

the key-value store being configured for communication with a plurality of additional processing devices over a network via at least one application programming interface of the key-value store;
wherein the ranged key corresponds to a single value stored in the key-value store;
wherein the ranged key comprises a lower key and an upper key of a range of keys but does not explicitly include intermediate keys of the range of keys; and
wherein presentation of the ranged key to the key-value store from a given one of the additional processing devices via the application programming interface returns the corresponding single value stored in the key-value store for delivery to the given additional processing devices via the application programming interface.

18. A computer program product comprising a processor-readable storage medium having encoded therein executable code of one or more software programs, wherein the one or more software programs when executed cause said at least one processing device to perform the method of claim 17.

19. An information processing system comprising:
a computer system; and
a key-value store implemented by at least one processing device coupled to the computer system;
the key-value store being configured for communication with a plurality of additional processing devices of the computer system over a network via at least one application programming interface of the key-value store;
wherein the key-value store utilizes a skip list data structure having a plurality of layers each having two or more nodes;
wherein each of at least a subset of the nodes of the skip list data structure stores a corresponding ranged key;
wherein the ranged key corresponds to a single value stored in the key-value store;
wherein the ranged key comprises a lower key and an upper key of a range of keys but does not explicitly include intermediate keys of the range of keys; and
wherein presentation of the ranged key to the key-value store from a given one of the additional processing devices via the application programming interface returns the corresponding single value stored in the key-value store for delivery to the given additional processing device via the application programming interface.

20. The system of claim 19 further comprising a burst buffer appliance coupled between the computer system and the key-value store, wherein the burst buffer appliance comprises:
a high-speed memory having a substantially lower access time than a file system associated with the key-value store; and
an analytics engine;
the burst buffer appliance being configured to process ranged keys of one or more skip list data structures for storage in or retrieval from the file system associated with the key-value store.

* * * * *

UNITED STATES PATENT AND TRADEMARK OFFICE
CERTIFICATE OF CORRECTION

PATENT NO. : 9,665,623 B1
APPLICATION NO. : 13/840420
DATED : May 30, 2017
INVENTOR(S) : Tao Peng et al.

Page 1 of 1

It is certified that error appears in the above-identified patent and that said Letters Patent is hereby corrected as shown below:

In the Specification

Column 4, Line 27 delete "JO" and replace it with --IO--

Column 4, Line 33 delete "JO" and replace it with --IO--

Column 4, Line 39 delete "JO" and replace it with --IO--

Signed and Sealed this
Eighth Day of August, 2017

Joseph Matal
*Performing the Functions and Duties of the
Under Secretary of Commerce for Intellectual Property and
Director of the United States Patent and Trademark Office*